2,748,130
Patented May 29, 1956

2,748,130

PRODUCTION OF COMPOUNDS OF THE PYRIDINE SERIES

Walter Reppe, Heinrich Pasedach, and Matthias Seefelder, Ludwigshafen (Rhine), Germany, assignors to Badische Anilin- & Soda-Fabrik Aktiengesellschaft, Ludwigshafen (Rhine), Germany No Drawing. Application April 13, 1953,
Serial No. 348,566

Claims priority, application Germany April 19, 1952

5 Claims. (Cl. 260—290)

The present invention relates to compounds of the pyridine series, especially to pyridine and its lower homologues, and a novel process for their production.

We have found that compounds of the pyridine series are obtained in good yields by reacting glutaric dialdehydes or $\delta$-ketoaldehydes as such or in the form of their acetals, in particular in the form of their cyclic enol acetals, i. e. the 2-alkoxy-2.3-dihydropyranes, or the corresponding 2-acyloxy-2.3-dihydropyranes at temperatures between about 90° and 220° C., preferably at 100° to 180° C., with hydroxylammonium salts.

For the simplest case of the reaction of glutaric dialdehyde or its cyclic enol acetal 2-ethoxy-2.3-dihydropyrane with hydroxylammonium salts, the reaction may be represented according to the following scheme A or B:

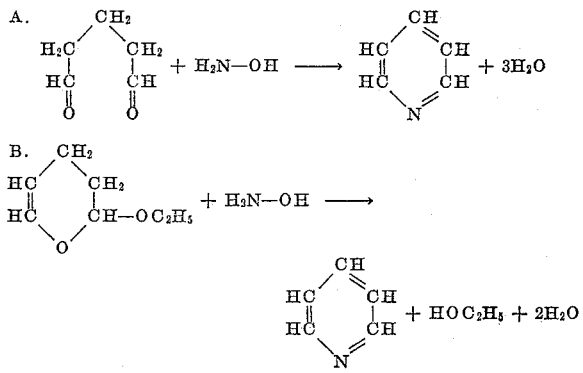

the acid contained in the hydroxylammonium salt not being shown.

The 2-alkoxy-2.3-dihydropyranes to be used as initial materials for the B modification of the process are known to be readily accessible by diene synthesis from vinyl ethers and $\alpha.\beta$-unsaturated carbonyl compounds, for example 2-methoxy-2.3-dihydropyrane from acrolein and methyl vinyl ether, 2-ethoxy-4-methyl-2.3-dihydropyrane from crotonaldehyde and ethyl vinyl ether, 2-methoxy-5-methyl-2.3-dihydropyrane from $\alpha$-methylacrolein and methyl vinyl ether, 2-ethoxy-4-ethyl-5-methyl-2.3-dihydropyrane from $\alpha$-methyl-$\beta$-ethylacrolein and vinyl ethyl ether or 2-methoxy-6-methyl-2.3-dihydropyrane from vinyl methyl ketone and methyl vinyl ether. The 2-acyloxy-2.3-dihydropyranes are obtained in a corresponding manner from vinyl esters and $\alpha.\beta$-unsaturated carbonyl compounds, as for example 2-acetoxy-2.3-dihydropyrane from vinyl acetate and acrolein. Other starting materials for such pyranes are $\alpha.\beta$-dimethylacrolein and other $\alpha.\beta$-dialkylacroleins wherein the alkyl group contains up to 5 carbon atoms.

These 2-alkoxy- or 2-acyloxy-2.3-dihydropyranes are known to be capable of ready saponification in acid medium to the free glutaric dialdehydes or $\delta$-ketoaldehydes, respectively, which serve as initial materials for the A modification of the process, or of conversion into their open-chain acetals. Glutaric dialdehydes, $\delta$-ketoaldehydes or their acetals which have been prepared in other ways, as for example by reduction of glutaric acid derivatives, can obviously also be used as initial materials.

As hydroxylammonium salts there may be used, inter alia, the hydrochloride, hydrobromide or sulfate of hydroxylamine or also compounds which are converted into hydroxylammonium salts under the reaction conditions, as for example technical solutions of hydroxylamine-mono- or -di-sulfonic acids.

The reaction according to scheme A or B is preferably carried out by introducing the glutaric aldehyde or 2-alkoxy-2.3-dihydropyrane at elevated temperature into an aqueous or aqueous-alcoholic solution of the hydroxylammonium salt. The yields of pyridine or pyridine derivatives usually increase with increasing temperature; the best yields are obtained at temperatures above 100° C., in particular above 125° C., pressure vessels being used. The process may be carried out continuously by leading the components together through heated pressure tubes.

By the above methods there may be obtained in good yields from initial materials which are readily accessible technically, pyridine itself and also pure pyridine homologues, such as $\alpha$-, $\beta$- or $\gamma$-alkylpyridines or other compounds of the pyridine series which are free from isomers. The compounds of the pyridine series are valuable intermediate products, in particular for pharmaceutical products.

Pyridine bases have already been prepared by treating 2-alkoxy-2.3-dihydropyranes with ammonia at 300° to 450° C. (see U. S. patent specification No. 2,528,978). The yields are, however, unsatisfactory. Attempts have also already been made to convert glutaric dialdehyde oximes into pyridine bases by gradually heating to boiling a mixture of oximes and mineral acid (see Berichte der Deutschen Chem. Ges., volume 46 (1913), page 110, and Journal of the Chemical Society, London 1937, page 300). In this way, however, yields of pyridine bases higher than about 20% of the theoretical yield have never been obtained and in the main tarry masses are formed. In contrast, the process according to the present invention gives yields of 50 to 80% or more of the theoretical yield of pyridine bases.

The following examples will further illustrate this invention but the invention is not restricted to these examples; the parts are parts by weight.

Example 1

128 parts of 2-ethoxy-2.3-dihydropyrane are introduced while stirring during the course of 3 hours into a solution of 90 parts of hydroxylammonium chloride in 1000 parts of water situated in a heated autoclave. The ethyl alcohol formed is distilled off from the reaction mixture continuously or at the end of the reaction. The whole is then made alkaline by the addition of caustic soda solution and distilled until no more pyridine passes over. The distillate is saturated with caustic soda, the pyridine thus separating as an oily layer. It is separated from the aqueous layer, dried over solid caustic potash and distilled.

Pure pyridine having the boiling point 114° to 116° C. is obtained; the yield is 70 to 80% of the theoretical yield if the reaction is carried out at 120° to 130° C., or 50 to 60% of the theoretical yield if the reaction is carried out at 100° C.

Example 2

142 parts of 2-ethoxy-4-methyl-2.3-dihydropyrane (prepared by diene synthesis from crotonaldehyde and ethyl vinyl ether) are reacted at 100° C. with 90 parts of hydroxylammonium chloride in the manner described in Example 1. 55 parts of a γ-picoline having the boiling point 142° to 144° C. are thus obtained.

*Example 3*

3500 parts of a technical aqueous solution of the sodium salt of hydroxylamine di- and mono-sulfonic acids which corresponds to a hydroxylamine content of about 5.5%, are heated to boiling in a stirring vessel fitted with a reflux condenser. Within 11 hours, 568 parts of 2-ethoxy-4-methyl-2.3-dihydropyrane are introduced by adding about 50 parts per hour to the boiling mixture. During the first eight hours of the reaction the temperature of the solution amounts to 100° to 105° C., while during the last three hours it falls to 95° C.

After the whole of the 2-ethoxy-4-methyl-2.3-dihydropyrane has been introduced, it is heated under reflux for an hour and then the ethyl alcohol formed is distilled off. After adding alkali, an aqueous distillate is obtained which contains 250 parts of pure γ-picoline. The yield corresponds to 67% of the theoretical yield.

*Example 4*

640 parts of a 15% aqueous solution of 2-methyl glutaric dialdehyde (prepared by hydrolysis of 2-ethoxy-4-methyl-2.3-dihydropyrane with dilute hydrochloric acid at 30° C.) are introduced into a boiling solution of 90 parts of hydroxylammonium chloride in 200 parts of water during the course of 2½ hours. The whole is heated to boiling for about 15 minutes under reflux and the γ-picoline formed is then isolated in the manner described in Example 1. The yield is 45 parts of pure γ-picoline, corresponding to 57% of the theoretical yield.

*Example 5*

128 parts of 2-methoxy-5-methyl-2.3-dihydropyrane (prepared by diene synthesis from α-methylacrolein and methyl vinyl ether) are caused to react at 100° to 120° C. with 90 parts of hydroxylammoniumchloride in the manner described in Example 1. There are obtained 50 parts of β-picoline.

*Example 6*

128 parts of 2-methoxy-6-methyl-2.3-dihydropyrane (prepared by diene synthesis from vinyl methyl ketone and methyl vinyl ether) are caused to react at 110° C. with 90 parts of hydroxylammonium chloride in the manner described in Example 1. There are obtained about 42 parts of α-picoline.

*Example 7*

144 parts of 2-acetoxy-2.3-dihydropyrane (prepared by diene synthesis from vinyl acetate and acrolein) are caused to react at 100° to 110° C. with 90 parts of hydroxylammonium chloride in the manner described in Example 1. There are obtained about 50 parts of pyridine.

*Example 8*

170 parts of 2-ethoxy-4-ethyl-5-methyl-2.3-dihydropyrane (prepared by diene synthesis from α-methyl-β-ethylacrolein and ethyl-vinyl-ether) are caused to react at 110° C. with 90 parts of hydroxyl-ammoniumchloride in the manner described in Example 1. There are obtained 73 parts of 3-methyl-4-ethyl-pyridine, boiling-point 196° C.

What we claim is:

1. An improved process for the production of pyridine bases which comprises gradually introducing a member of the group consisting of glutaric dialdehyde, alkyl glutaric dialdehydes and 2-alkoxy- and 2-acyloxy-2,3-dihydropyranes at temperatures between 90° C. and 220° C. into aqueous solutions of at least equimolecular amounts hydroxylammonium salts.

2. A process for the produlction of pure gamma-picoline which comprises gradually introducing 2-ethoxy-4-methyl-2,3-dihydropyrane into a boiling aqueous solution of at least equimolecular amounts of a member of the group consisting of hydroxylmmonium chloride and hydroxylammonium sulfate.

3. A process for the production of pure beta-picoline which comprises gradually introducing 2-methoxy-5-methyl-2,3-dihydropyrane into an aqueous solution of at least equimolecular amounts of a hydroxylammonium salt at about 100° to 120° C.

4. A process for the production of pure alpha-picoline which comprises gradually introducing 2-methoxy-6-methyl-2,3-dihydropyrane into an aqueous solution of at least equimolecular amounts of a hydroxylammonium salt at about 110° C.

5. An improved process for the production of pure pyridine which comprises gradually introducing 2-ethoxy-2,3-dihydroyprane into an aqueous solution of at least equimolecular amounts of hydroxylammonium chloride at about 100° to 130° C.

References Cited in the file of this patent

UNITED STATES PATENTS

| | | |
|---|---|---|
| 2,528,978 | Smith et al. | Nov. 7, 1950 |
| 2,546,018 | Smith et al. | Mar. 20, 1951 |

OTHER REFERENCES

Shaw: J. Chem. Soc. 1937, pp. 300–2.

Elderfield: "Heterocyclic Compounds," (Wiley), vol. 1, p. 465 (1950).